(12) United States Patent
Suzuki et al.

(10) Patent No.: US 8,038,358 B2
(45) Date of Patent: Oct. 18, 2011

(54) TAPE PRINTING APPARATUS AND COMPUTER-READABLE RECORDING MEDIUM STORING TAPE PRINT PROGRAM

(75) Inventors: Yuichiro Suzuki, Komaki (JP); Junya Kawai, Nagoya (JP); Hajime Okochi, Inazawa (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 584 days.

(21) Appl. No.: 12/009,189

(22) Filed: Jan. 17, 2008

(65) Prior Publication Data

US 2008/0181702 A1 Jul. 31, 2008

(30) Foreign Application Priority Data

Jan. 25, 2007 (JP) ................................. 2007-014469

(51) Int. Cl.
*B41J 5/30* (2006.01)
*B41J 11/44* (2006.01)
*B41J 3/46* (2006.01)

(52) U.S. Cl. .............................. 400/61; 400/76; 400/83

(58) Field of Classification Search .................... 400/61, 400/76, 83, 615, 615.2
See application file for complete search history.

(56) References Cited

U.S. PATENT DOCUMENTS

| | | | | |
|---|---|---|---|---|
| 5,314,256 A * | 5/1994 | Niwa | | 400/61 |
| 5,503,482 A * | 4/1996 | Kawakami et al. | | 400/83 |
| 5,559,934 A | 9/1996 | Ogura et al. | | |
| 5,609,424 A * | 3/1997 | Sakuragi et al. | | 400/61 |
| 5,651,619 A * | 7/1997 | Nunokawa et al. | | 400/83 |
| 5,873,110 A | 2/1999 | Toyosawa et al. | | |
| 5,885,012 A * | 3/1999 | Hastings et al. | | 400/83 |
| 5,933,589 A * | 8/1999 | Hidaka et al. | | 358/1.18 |
| 5,967,675 A * | 10/1999 | Hastings et al. | | 400/61 |
| 5,967,679 A * | 10/1999 | Beadman et al. | | 400/615.2 |
| 6,293,717 B1 * | 9/2001 | Kurashina | | 400/615.2 |
| 6,302,603 B1 * | 10/2001 | Akaiwa et al. | | 400/613 |
| 6,793,422 B2 * | 9/2004 | Kurashina | | 400/615.2 |
| 7,252,442 B2 | 8/2007 | Okochi et al. | | |
| 7,616,338 B2 * | 11/2009 | Vleurinck et al. | | 358/1.18 |
| 2007/0195337 A1 * | 8/2007 | Takayama et al. | | 358/1.2 |

FOREIGN PATENT DOCUMENTS

| | | |
|---|---|---|
| EP | 0 658 853 A2 | 6/1995 |
| GB | 2 314 956 A | 1/1998 |
| JP | 06-143694 A | 5/1994 |
| JP | 6290177 | 10/1994 |
| JP | 07-242023 A | 9/1995 |
| JP | 2000242256 A | 7/2000 |
| JP | 2005-212196 A | 8/2005 |

* cited by examiner

*Primary Examiner* — Leslie J Evanisko
*Assistant Examiner* — Marissa L Ferguson-Samreth
(74) *Attorney, Agent, or Firm* — Day Pitney LLP

(57) ABSTRACT

A tape printing apparatus includes an input device, a setting device, and a display device. The apparatus further includes a setting tape width image storage device, a character size image storage device, a tape width acquisition device, a character size acquisition device, a setting tape width image reading device that reads out one of setting tape width images from the setting tape width image storage device, and a character size image reading device that reads out one of character size images from the character size image storage device. The apparatus further includes a setting guide image generation device that generates a setting guide image by combining the one of the setting tape width images and the one of the character size images, and a setting display control device that displays the setting guide image on a setting screen.

4 Claims, 14 Drawing Sheets

TAPE PRINTING APPARATUS AND COMPUTER-READABLE RECORDING MEDIUM STORING TAPE PRINT PROGRAM

CROSS-REFERENCE TO RELATED APPLICATION

This application claims priority from JP2007-014469, filed Jan. 25, 2007, the content of which is hereby incorporated by reference in its entirety.

BACKGROUND

The present disclosure relates to a tape printing apparatus and a computer-readable recording medium storing a tape print program.

Conventionally, a tape printing apparatus which is equipped with character input keys and performs printing of an input character string on a tape has been known. Through the input keys, a user can input character strings and print phrases and sentences. During inputting and editing by the user, the input character strings are displayed on a small-sized liquid crystal display (LCD) provided to the tape printing apparatus. Further, the user can set the size of a character string to be printed and carry out various types of decoration of the character string. However, the character size and the decoration may not be shown as printed on an edit screen, owing to restrictions of a display capacity. Consequently, the user cannot easily know the printing result. In a case where the user inputs a character string including a plurality of lines, such a problem would occur that it is difficult for the user to know which one of the lines is being edited.

To solve the problem, a printing apparatus is made available which displays the number of lines of an input character string and a currently inputted line in a region of an edit screen (e.g., Japanese Laid-Open Patent Publication No. Hei 6-290177).

With the aforementioned conventional printing apparatus, the user can know which one of the lines is currently inputted. However, the user cannot know a size of a currently inputted character relative to the width of a print tape before printing. Therefore, after printing, the user often finds the printed characters to be unexpectedly smaller or larger relative to the tape width. In such a case, the user has to print the characters over again after resetting.

SUMMARY

Various exemplary embodiments of the board principles derived herein provide a tape printing apparatus that enables a user to know a size of an inputted character relative to a print medium.

Exemplary examples provide a tape printing apparatus that prints a character and/or a symbol on a tape mounted in a detachable tape cassette. The apparatus includes an input device that inputs the character and/or the symbol, a setting device that sets a character size, the character size being a size of the character and/or the symbol to be printed, a display device that displays a setting screen and an edit screen, the setting screen being used for setting the character size using the setting device, and the edit screen being used for displaying the character and/or the symbol inputted by the input device, a setting tape width image storage device that stores setting tape width images corresponding to respective tape widths, each of the setting tape width images indicating a tape width to be displayed on the setting screen, a character size image storage device that stores character size images corresponding to respective character sizes, each of the character size images indicating a size of a character and/or a symbol relative to the tape width when the character and/or the symbol is printed on a tape having the tape width indicated by each of the setting tape width images, a tape width acquisition device that acquires a tape width of the tape mounted in the tape cassette attached in the apparatus, a character size acquisition device that acquires the character size set by the setting device, a setting tape width image reading device that reads out one of the setting tape width images from the setting tape width image storage device, the one of the setting tape width images corresponding to the tape width acquired by the tape width acquisition device, a character size image reading device that reads out one of the character size images from the character size image storage device, the one of the character size images corresponding to the character size acquired by the character size acquisition device, a setting guide image generation device that generates a setting guide image by combining the one of the setting tape width images and the one of the character size images, the one of the setting tape width images being read out by the setting tape width image reading device, and the one of the character size images being read out by the character size image reading device, and a setting display control device that displays the setting guide image on the setting screen, the setting guide image being generated by the setting guide image generation device.

Exemplary examples provide a computer-readable recording medium storing a tape print program. The program includes instructions to cause a controller to perform a tape width acquisition step of acquiring a width of a tape mounted in a detachable tape cassette attached in a tape printing apparatus, a character size acquisition step of acquiring a character size being set beforehand, the character size being a size of a character and/or a symbol to be printed, a setting tape width image reading step of reading out one of setting tape width images stored for respective tape widths, corresponding to the tape width acquired in the tape width acquisition step, the setting tape width images indicating the respective tape widths, a character size image reading step of reading out one of character size images stored for respective character sizes, corresponding to the character size acquired in the character size acquisition step, the character size images indicating the respective sizes of the character and/or the symbol relative to the tape width when the character and/or the symbol is printed on a tape having the tape width indicated by the one of the setting tape width images, a setting guide image generation step of generating a setting guide image by combining the one of the setting tape width images and the one of the character size images, the one of the setting tape width images being read out in the setting tape width image reading step, and the one of the character size images being read out in the character size image reading step, and a setting display control step of displaying the setting guide image on a setting screen, the setting guide image being generated in the setting guide image generation step, and the setting screen being used for setting the character size.

BRIEF DESCRIPTION OF THE DRAWINGS

Exemplary embodiments will be described below in detail with reference to the accompanying drawings in which.

DETAILED DESCRIPTION OF THE EXEMPLARY EMBODIMENTS

The following will describe an exemplary embodiment of the present disclosure with reference to the drawings. First, the configuration of a tape printing apparatus 1 will be described below with reference to FIGS. 1-4.

Figure 1:
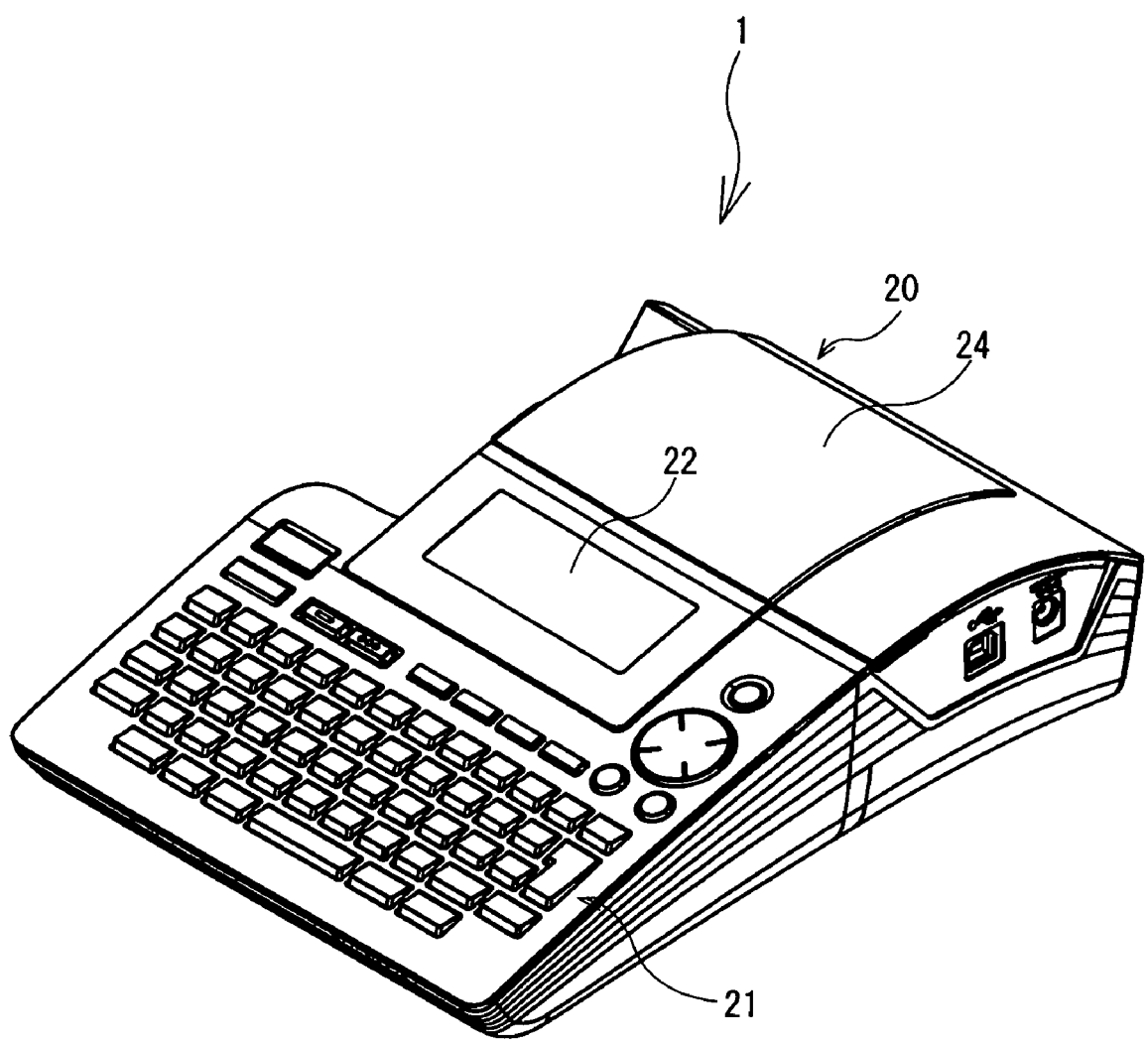
FIG. 1 is a perspective view showing an outer appearance of a tape printing apparatus.

As shown in FIG. 1, the tape printing apparatus 1 is equipped with a keyboard 21 at its front section. A plurality of keys are arranged on the keyboard 21. The keys are used for inputting characters, symbols, and various function commands. An LCD 22 is equipped behind the keyboard 21. Pressing a function key on the keyboard 21, the user can display a setting screen on the LCD 22 to establish settings, such as a font, a character size, decoration, and character alignment.

At a rear section of the tape printing apparatus 1, a cassette attachment section 20 is equipped. In the cassette attachment section 20, a tape cassette (not shown) can be attached. The tape cassette contains a tape serving as a print medium and an ink ribbon wound around. The cassette attachment section 20 has a cover 24 that can be opened and closed. The cover 24 may cover a tape cassette attached in the cassette attachment section 20. The cover 24 prevents the user from damaging the apparatus 1 and the tape cassette when the user replaces the tape cassette mistakenly during printing. If the cover 24 is not closed, printing cannot be carried out. On the other hand, if the cover 24 is closed, a tape detection sensor, which will be described later, detects the attachment of the tape cassette.

Figure 2:
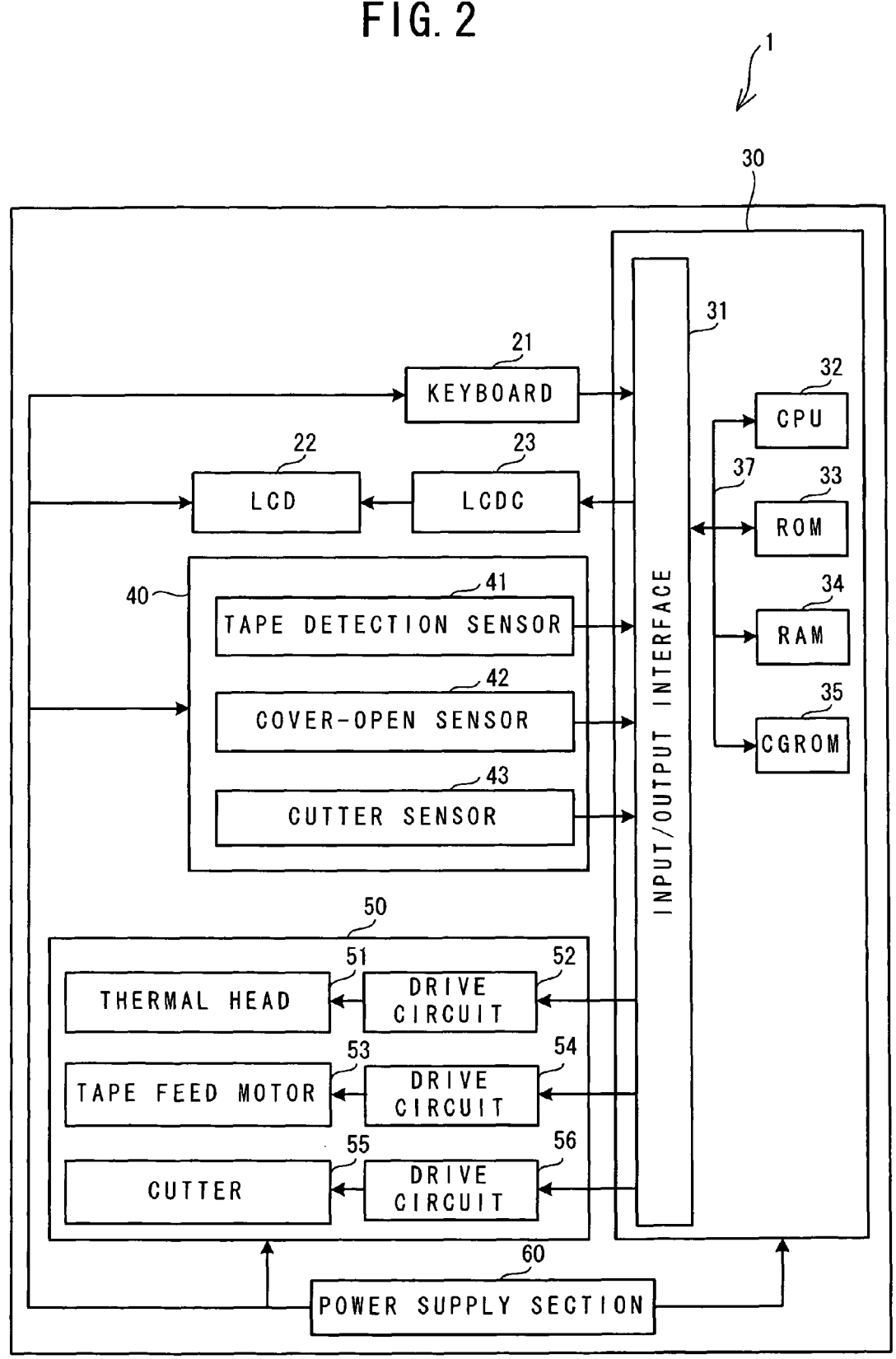
FIG. 2 is a block diagram showing a main electric configuration of the tape printing apparatus.

As shown in FIG. 2, the tape printing apparatus 1 is constituted mainly of a control section 30, a sensor section 40, a print mechanism 50, and a power supply section 60 equipped with a battery. The control section 30 includes a CPU 32 that controls each section of the tape printing apparatus 1, an input/output interface 31, a ROM 33 in which various programs are stored, a RAM 34 that stores various flags and parameters as well as printing data, and a CGROM 35 in which graphic data is stored, which are connected to the CPU 32 via a data bus 37.

Figure 3:
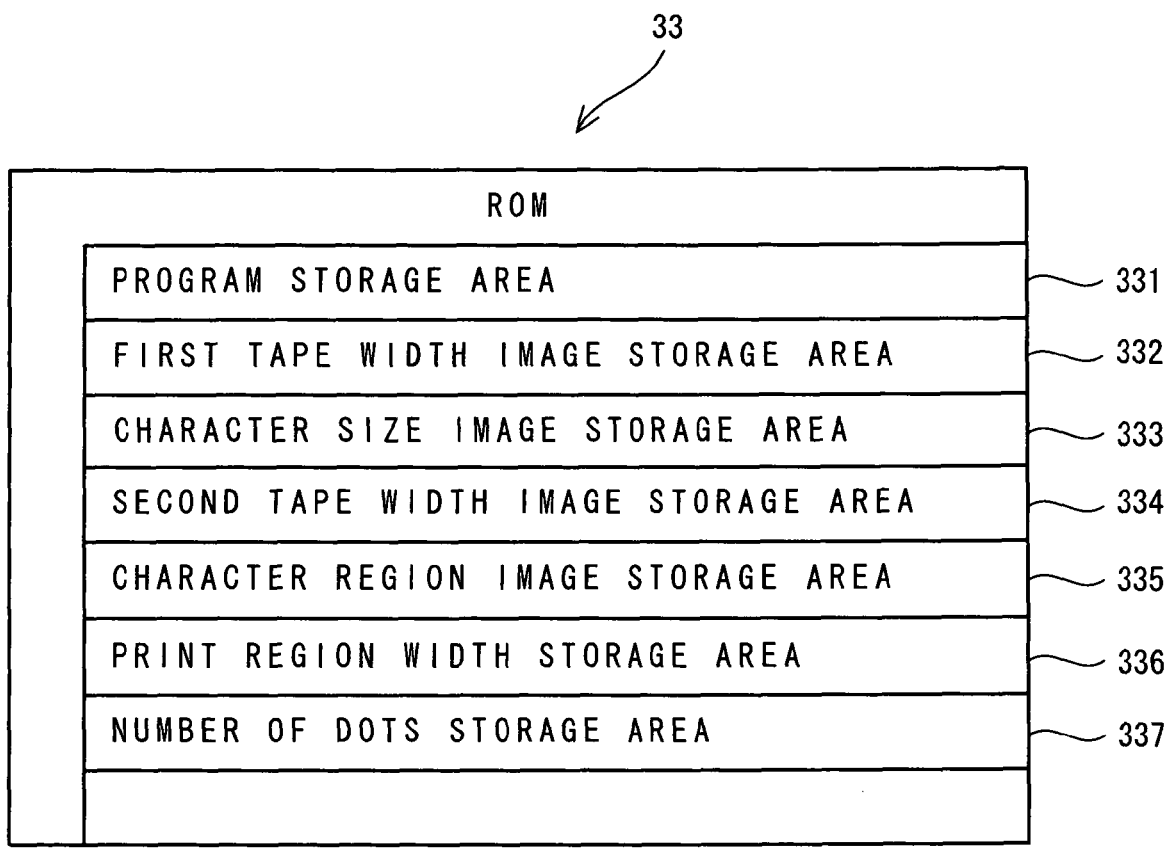
FIG. 3 is a conceptual diagram showing a configuration of an ROM.

The ROM 33 will be described below with reference to FIG. 3. The ROM 33 includes storage areas, such as a program storage area 331, a first tape width image storage area 332, a character size image storage area 333, a second tape width image storage area 334, a character region image storage area 335, a print region width storage area 336, and a number of dots storage area 337. In the program storage area 331, control programs, such as a setting screen processing program and an edit screen processing program, are stored. In the first tape width image storage area 332, image data of a tape width to be displayed on the setting screen (e.g., tape width image 101 in FIG. 6) is stored, corresponding to each tape width. In the character size image storage area 333, image data of a character size to be displayed on the setting screen (e.g., character size image 111 in FIG. 6) is stored, corresponding to each character size. In the second tape width image storage area 334, tape width image data to be displayed on the edit screen (e.g., tape width image 121 in FIG. 11) is stored, corresponding to each tape width. In the character region image storage area 335, character region image data to be displayed on the edit screen (e.g., character region image 131 in FIG. 11) is stored, corresponding to each character size. In the print region width storage area 336, print region widths are stored, corresponding to respective tape widths. In the number of dots storage area 337, the numbers of dots are stored, corresponding to respective character sizes.

Figure 4:
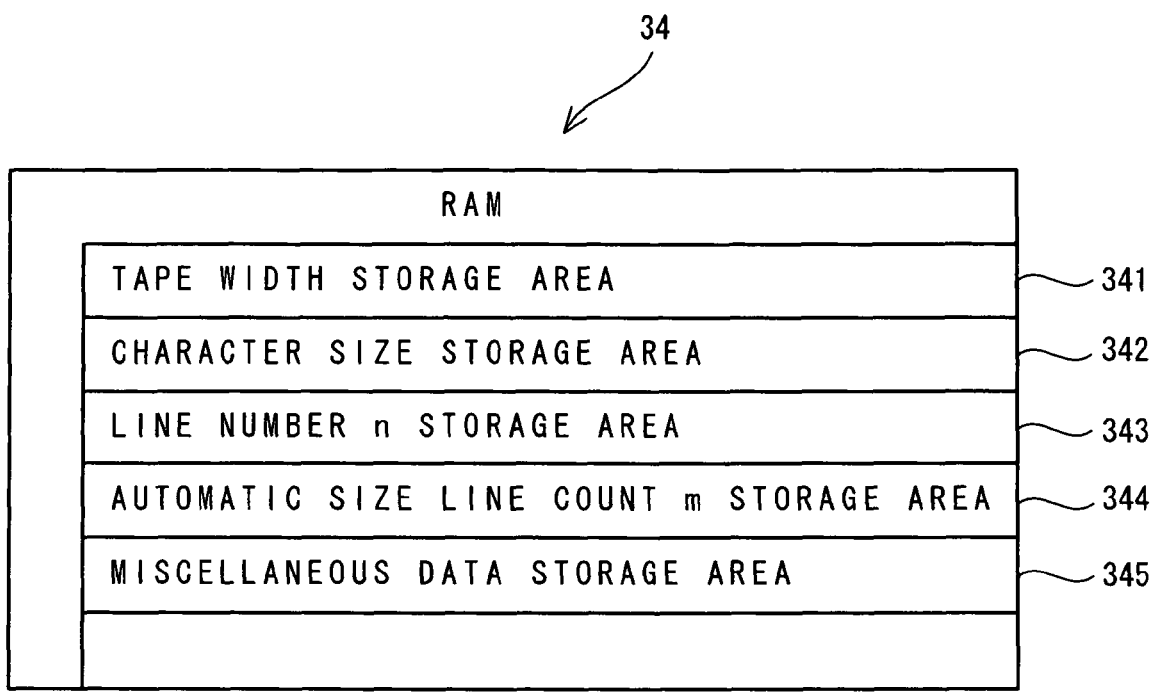
FIG. 4 is a conceptual diagram showing a configuration of an RAM.

The RAM 34 will be described below with reference to FIG. 4. The RAM 34 includes storage areas, such as a tape width storage area 341, a character size storage area 342, a line number n storage area 343, an automatic size line count m storage area 344, and a miscellaneous data storage area 345. The tape width storage area 341 stores width of a tape that is currently mounted. The character size storage area 342 stores a character size that is currently set. The line number n storage area 343 stores a line number n of a line to be processed. The automatic size line count m storage area 344 stores m, which represents the number of lines in which a character size is to be set automatically (hereinafter "number of lines in which a character size is to be set automatically" is simply referred to as "number of automatic size lines"). The miscellaneous data storage area 345 stores other data.

The sensor section 40 includes a tape detection sensor 41, an cover-open sensor 42, and a cutter sensor 43. The tape detection sensor 41 detects a tape width of a tape cassette that is currently attached in the cassette attachment section 20. The cover-open sensor 42 detects whether the cover 24 is open or closed. The cutter sensor 43 detects whether a movable blade of a cutter 55 is placed at a predetermined reference position for cutting. The cutter 55 is equipped with a stationary blade and the movable blade in the shape of a pair of scissors. The movable blade is positioned at the reference position when the movable blade and the stationary blade of the cutter 55 are open to each other. The sensors in the sensor section 40 are connected to the control section 30 via the input/output interface 31, to supply a detected result to the control section 30. The method of detection by the tape detection sensor 41, the cover-open sensor 42, and the cutter sensor 43 is the same as a method of detection by a tape printer conventionally known and so an explanation of the method is omitted here. In the present embodiment, when the cover 24 is closed, the cover-open sensor 42 detects whether a tape cassette is attached.

The print mechanism 50 includes a thermal head 51, a drive circuit 52, a tape feed motor 53, a drive circuit 54, a cutter 55, and a drive circuit 56. The drive circuit 52 drives the thermal head 51. The drive circuit 54 drives the tape feed motor 53. The drive circuit 56 drives the cutter 55. The drive circuits 52, 54, and 56 are connected via the input/output interface 31 to the control section 30. In accordance with an instruction from the control section 30, the print mechanism 50 carries out printing.

To the input/output interface 31, a liquid crystal display controller (LCDC) 23 and the keyboard 21 are connected. The display controller (LCDC) 23 controls data to be displayed on the LCD 22.

The power supply section 60 is connected to the control section 30, the sensor section 40, the print mechanism 50, the LCD 22, and the keyboard 21. When a main power supply is turned on to provide a power-on state, power is supplied to all of the control section 30, the sensor section 40, the print mechanism 50, the LCD 22, and the keyboard 21.

The following will describe operations of the tape printing apparatus 1 having the above-described configuration. When power is applied to the tape printing apparatus 1, the tape printing apparatus 1 is initialized. Then, in accordance with what is inputted through the keyboard 21, a text is edited, various types of setting are performed, and printing is carried out. In text editing and various types of setting, contents of the editing and the setting will be displayed on the LCD 22. Screen processing in setting processing and edit processing will be described below. First, setting screen processing will be described with reference to FIGS. 5-7.

Figure 5:
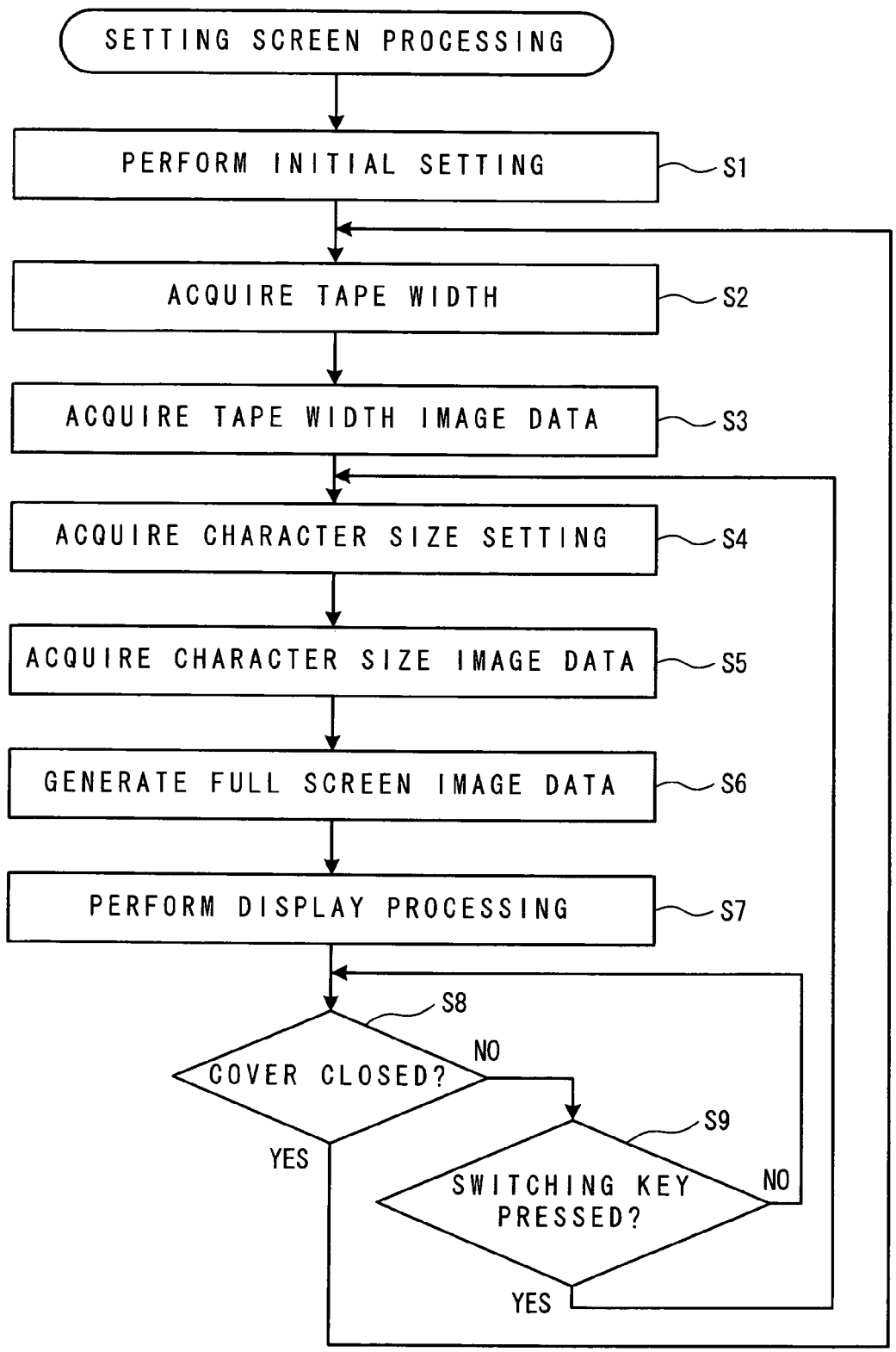
FIG. 5 is a flowchart of setting screen processing.

If the function key on the keyboard 21 is pressed, the setting processing starts. Then, as shown in FIG. 5, the setting screen processing starts. First, the CPU 32 performs various types of initial setting (S1). Next, the CPU 32 acquires a tape width of a tape in a tape cassette that is currently mounted in the cassette attachment section 20 (S2). The tape width is inputted from the tape detection sensor 41 at a predetermined timing such as when the cover 24 is closed and when a print key on the keyboard 21 is pressed. The inputted tape width is stored in the tape width storage area 341 of the RAM 34. The CPU 32 acquires a value of the stored width. Then, the CPU 32 acquires the tape width image data corresponding to the acquired tape width (S3). The tape width image data is stored in the first tape width image storage area 332 of the ROM 33.

The CPU 32 acquires a character size setting (S4). When power is applied, a character size is set to a default value and the default value is stored in the character size storage area 342 of the RAM 34. If the setting processing has been performed after the default value was stored, a newly set character size is stored in the character size storage area 342. Next, the CPU 32 acquires image data for display that corresponds to the acquired character size (S5). The character size image data is stored for each character size in the character size image storage area 333 of the ROM 33.

Figure 6:
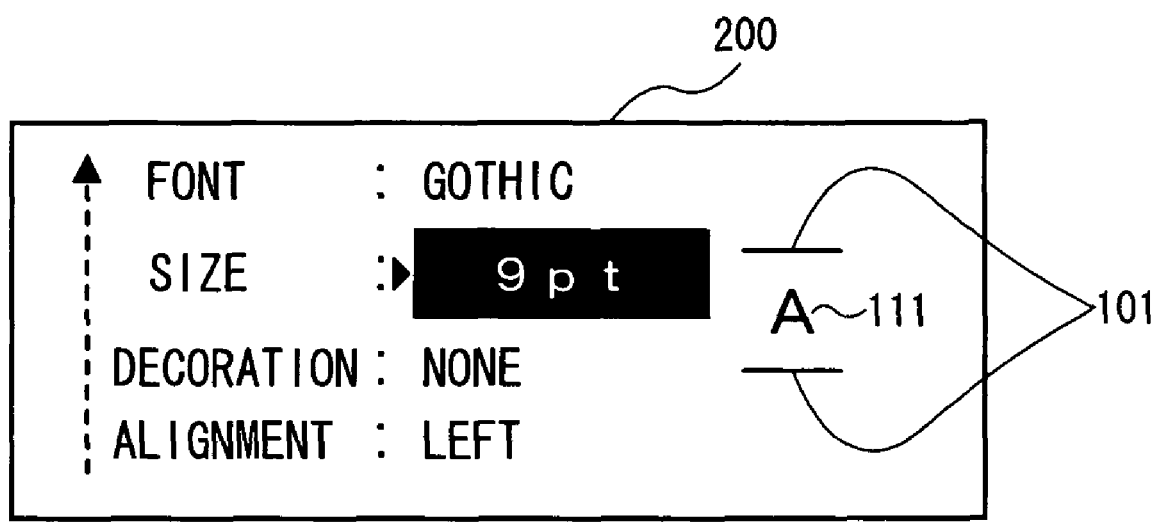
FIG. 6 is an explanatory illustration showing an example of a setting screen.
Figure 7:
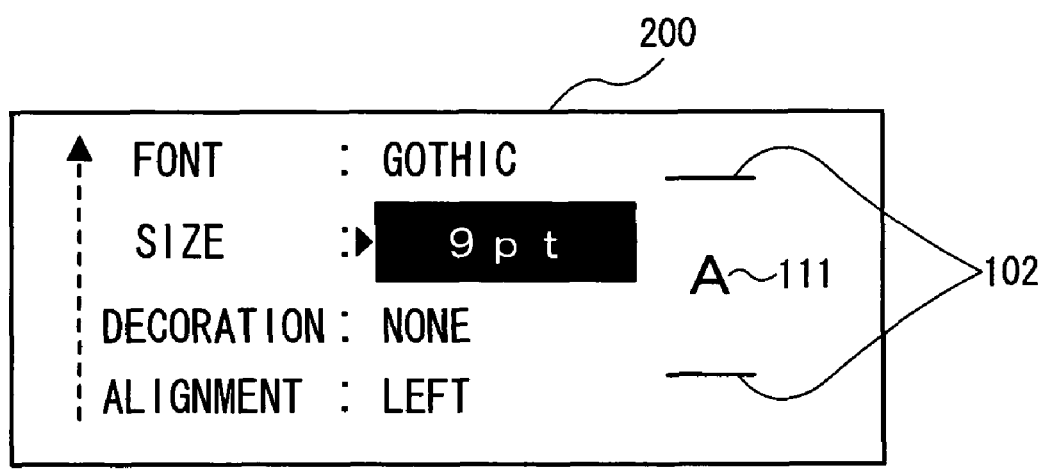
FIG. 7 is an explanatory illustration showing another example of the setting screen.

The CPU 32 combines the tape width image data acquired at S3, the character size image data acquired at S5, and image data corresponding to other set values, thereby generating image data for displaying a full screen image (S6). Next, the CPU 32 displays the generated image on the LCD 22 (S7). In consequence of the above processing, a setting screen 200, such as shown in FIGS. 6 and 7, appears on the LCD 22. If a mounted tape has a width of 6 mm and a character has a size of nine points, a tape width image 101 and a character size image 111 are combined to be displayed on a setting screen 200, as shown in FIG. 6. The character size image 111 is displayed in the tape width image 101, which shows two vertically placed horizontal lines representing the sides of the tape. Therefore, the user can easily know how much of the tape width a character occupies when the character is printed on the tape. If the mounted tape has a width of 12 mm and the character size is nine points, a tape width image 102 and the character size image 111 are combined to be displayed on the setting screen 200, as shown in FIG. 7. By comparing FIG. 6 with FIG. 7, the user can easily know that a margin is larger in the case of printing a 9-point-size character on a 12 mm-wide tape than in the case of printing a 9-point-size character on a 6 mm-wide tape.

If display processing (S7) ends, the CPU 32 acquires an input from the cover-open sensor 42 to determine whether the cover 24 is closed (S8). If the cover 24 is closed (YES at S8), there is a possibility that the tape cassette has been replaced and the tape width has been changed. Therefore, the CPU 32 returns to S2 to repeat the above processing from the step of acquiring the tape width.

If the cover 24 is not closed (NO at S8), the CPU 32 determines whether a switching key for changing a character size is pressed (S9). If the switching key is not pressed (NO at S9), the CPU 32 returns to S8. If the switching key is pressed (YES at S9), the CPU 32 returns to S4 to acquire a new character size and image data for display that corresponds to the acquired character size (S5). The CPU 32 generates new image data for displaying a full screen image (S6) to display the new full screen image on the LCD 22 (S7). The CPU 32 repeats the above processing until the function key is pressed again to end the setting processing so that the CPU 32 may exit the setting screen processing.

Next, edit screen processing will be described below with reference to FIGS. 8-14.

Figure 8:
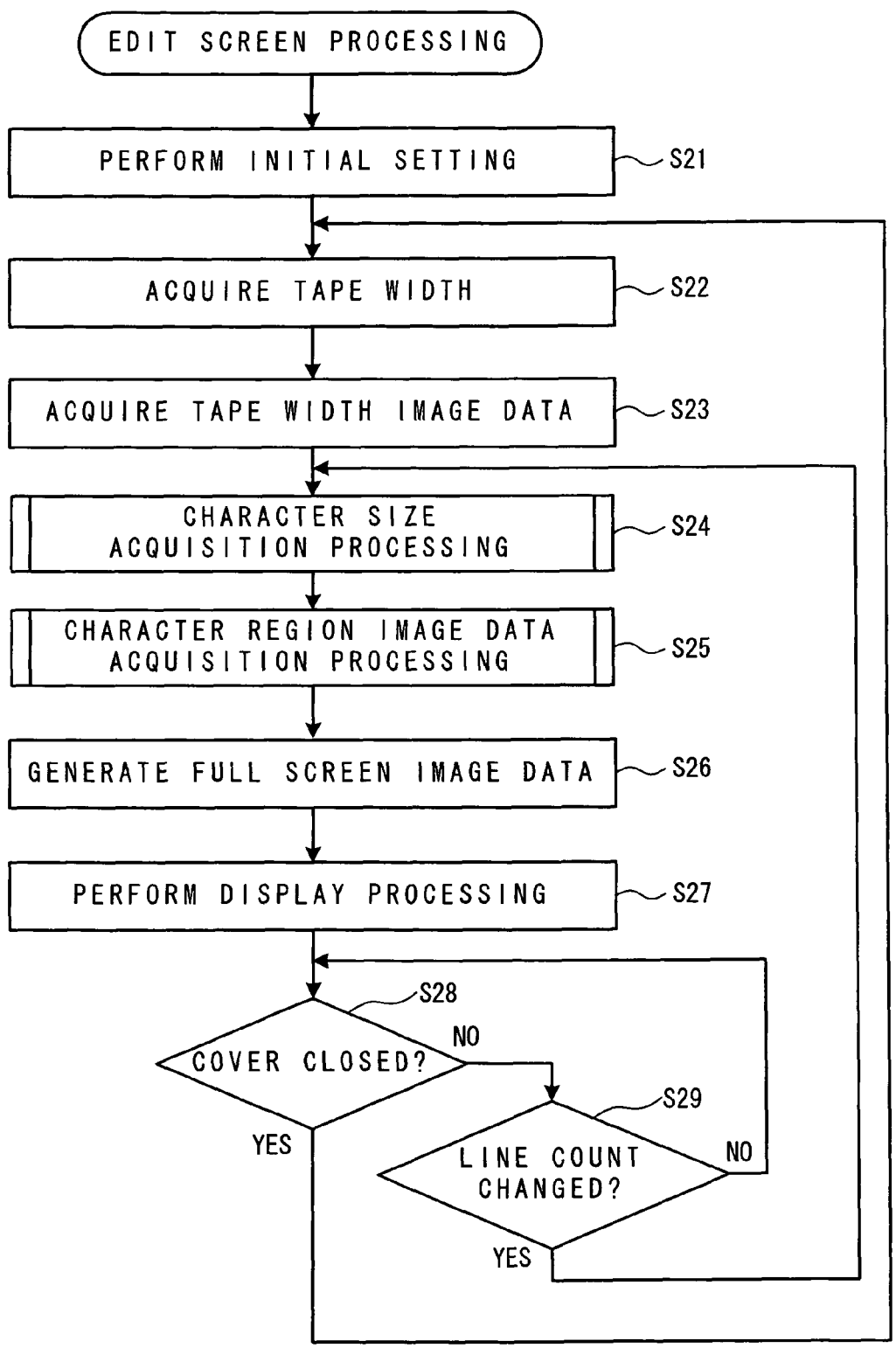
FIG. 8 is a flowchart of edit screen processing.

As shown in FIG. 8, when edit processing is started by an input through the keyboard 21, the CPU 32 performs initial setting for the edit screen (S21). The CPU 32 acquires the tape width of a tape in a tape cassette that is currently mounted in the cassette attachment section 20 (S22). As described above, the tape width is stored in the tape width storage area 341 of the RAM 34. The CPU 32 acquires a value of the stored width. Next, the CPU 32 acquires tape width image data corresponding to the acquired tape width (S23). The tape width image data for the edit screen is stored for each type tape width in the second tape width image storage area 334 of the ROM 33.

The CPU 32 performs character size acquisition processing (S24). The tape printing apparatus 1 is capable of editing and printing a plurality of lines, while the user can set a character size for the respective lines. The user can also set a character size to be made optimal for a tape width automatically. In the character size acquisition processing, the CPU 32 acquires a set character size of each line. If the character size is to be set automatically, the CPU 32 calculates a character size to acquire a calculated size.

Figure 9:
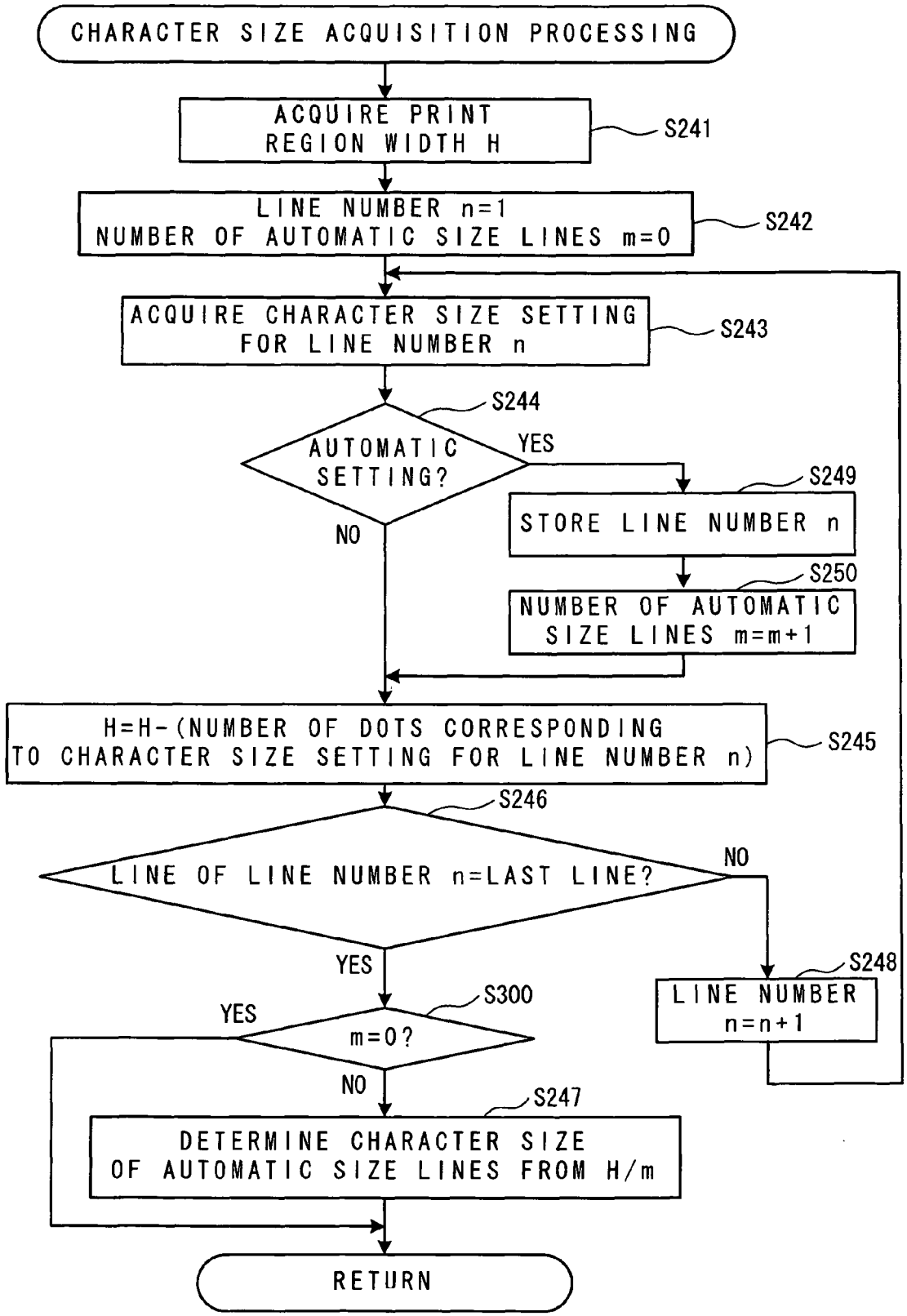
FIG. 9 is a flowchart of character size acquisition processing to be executed in the edit screen processing.
Figure 10:
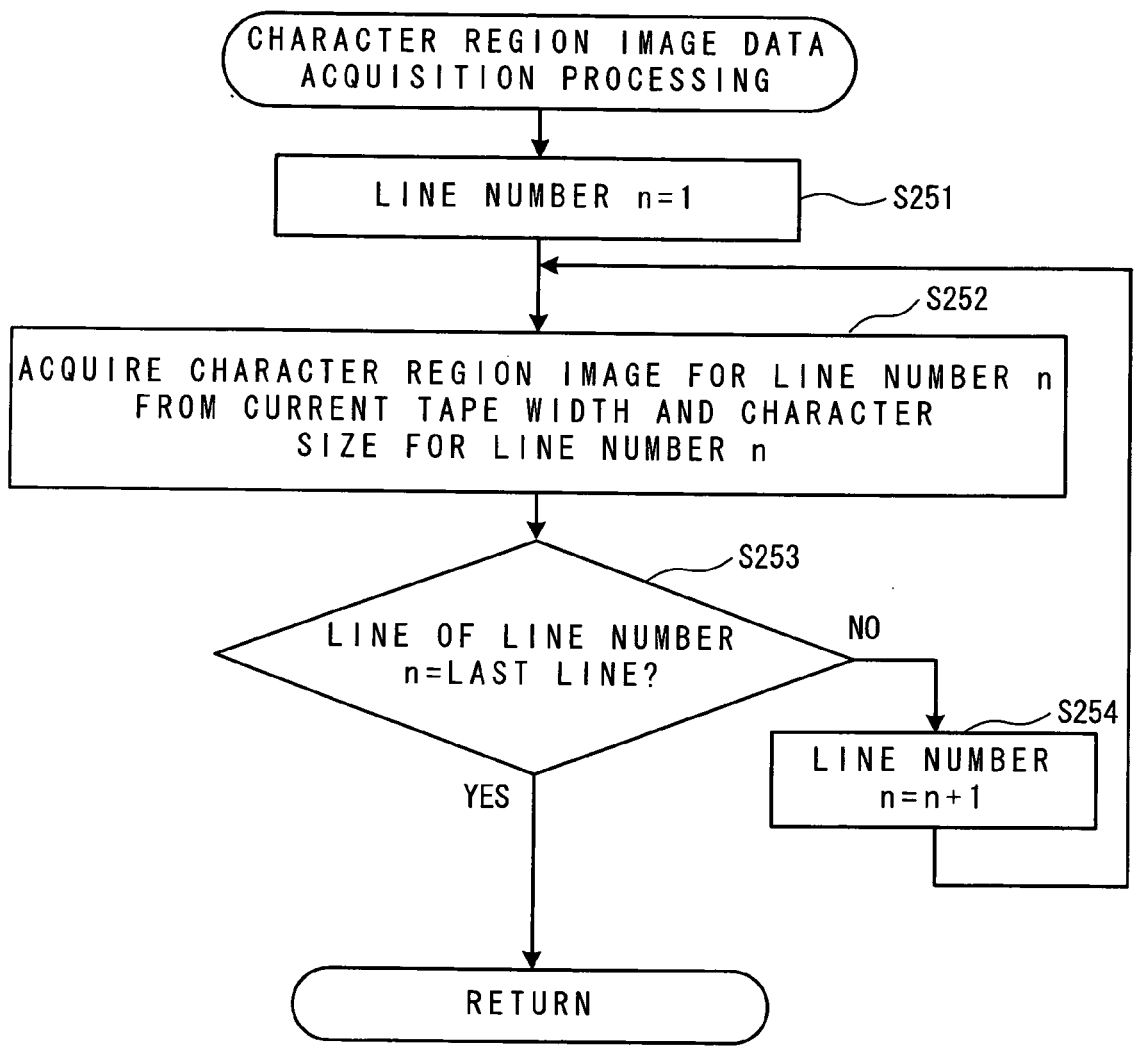
FIG. 10 is a flowchart of character region image data acquisition processing to be executed in the edit screen processing.

Now, the character size acquisition processing will be described below with reference to FIG. 9. The CPU 32 acquires a length in the tape width direction of a printable region of a tape having an acquired tape width (hereinafter "length in the tape width direction of a printable region of a tape" is simply referred to as "print region width") (S241). A predetermined value of the print region width H is determined for each tape width and stored in the print region width storage area 336 of the ROM 33. For example, 24 mm-wide, 18 mm-wide, 12 mm-wide, 9 mm-wide and 6 mm-wide tapes have print region width H of 128 dots, 112 dots, 70 dots, 50 dots, and 32 dots, respectively.

To perform the character size acquisition processing from the first line, the CPU 32 sets a line number n as 1 and stores the set value (1) in the line number n storage area 343. Further, the CPU 32 sets the number of automatic size lines m as 0 and stores the set value (0) in the automatic size line count m storage area 344 (S242). Next, the CPU 32 acquires a character size setting of a line having the line number n (S243). In the first round of processing, the CPU 32 acquires a character size of the first line. The user can set a character size any time on the setting screen by pressing a setting key on the keyboard 21. The set character size is stored in the character size storage area 342 of the RAM 34.

The CPU 32 determines whether the acquired character size is to be set automatically (S244). If the character size is not to be set automatically (NO at S244), the CPU 32 subtracts the number of dots corresponding to the character size of the line currently processed, which has been acquired at S243, from a value of a print region width H and substitutes the result in the print region width H (S245). The predetermined value of the number of dots corresponding to the character size is stored in the number of dots storage area 337 of the ROM 33. For example, 24-point, 18-point, 12-point, 9-point and 7-point sizes correspond to 64 dots, 48 dots, 32 dots, 24 dots, and 16 dots, respectively.

As Example 1, processing of the first line is described in a case where the tape width is 18 mm and the character size of the first line is nine points. The 18 mm-wide tape has a print region width H of 112 dots. The 9-point size corresponds to 24 dots. Therefore, the print region width H can be obtained as H=112−24=88.

The CPU 32 determines whether the currently processed line that has the line number n is the last line (S246). If the line having the line number n is the last line (YES at S246), the CPU 32 determines whether the number of automatic size lines m is 0 (S300). In Example 1, the number of automatic size lines m is 0 (YES at S300). In this case, it is unnecessary to perform the processing of S247 of determining a character size of a line in which a character size is to be set automatically. Therefore, the CPU 32 returns to the edit screen processing.

If the currently processed line that has the line number n is not the last line (NO at S246), the CPU 32 adds 1 to the line number n (S248). The CPU 32 returns to S243 to acquire a character size of the next line. As Example 2, processing of the second line is described in a case where the tape width is 18 mm and character sizes of the first and the second lines are 9 points and 24 points (corresponding to 64 dots), respectively. The character size is not to be set automatically (NO at S244), so that the CPU 32 calculates the print region width H (S245). As described above, through the first round of processing for the first line, the print region width H of 88 has been obtained. Therefore, the new print region width H can be obtained as H=88−64=24. If the second line is the last line (YES at S246), the CPU 32 determines whether the number of automatic size lines m is 0 (S300). As described above, if the number of automatic size lines m is 0 (YES at S300), the processing of S247 is unnecessary. Therefore, the CPU 32 returns to the edit screen processing.

As Example 3, a case is considered where the tape width is 12 mm, only one line is inputted, and a character size of the line is to be set automatically (YES at S244). The CPU 32 stores the line number n (=1) of the line for which the character size is to be set automatically in the line number n storage area 343 (S249) and then adds 1 to the number of automatic size lines m (S250). In the processing of the first line, the number of automatic size lines m is first set to 0 (S242), so that the number of automatic size lines m becomes 1. The CPU 32 stores the number of automatic size lines m in the automatic size line count m storage area 344.

The CPU 32 calculates the print region width H (S245). The 12 mm-wide tape has a print region width H of 70 dots. Since the character size of the current line is to be set automatically, the number of dots corresponding to the character size is not determined. Therefore, the print region width H remains 70 dots.

Since the first line is the last line (YES at S246) the CPU 32 determines whether the number of automatic size lines m is 0 (S300). If the number of automatic size lines m is not 0 (NO at S300), the CPU 32 determines by calculation a character size of the line in which the character size is to be set automatically (S247). Since the number of automatic size lines m is set to 1 (NO at S300), the CPU 32 determines 70/1=70 (dots) by calculation. Since the largest character size that does not exceed the size of 70 dots is of 24 points, a character size of the line for which the character size is to be set automatically is determined as 24 points.

As Example 4, a case is considered where the tape width is 12 mm, the character size is to be set automatically, and two lines are inputted. Like in Example 3, in the first round of processing, processing from S241 to S245 is performed. Since the first line is not the last line (NO at S246), the CPU 32 adds 1 to the line number n (S248) and returns to S243 to perform the processing of the second line. Since the character size of the second line is also to be set automatically (YES at S244), the CPU 32 stores the line number n (=2) in the line number n storage area 343 (S249). Then, the CPU 32 adds 1 to the number of automatic size lines m (S250). Since the number of automatic size lines m has been set as 1 in the processing of the first line, the current number of automatic size lines m becomes 2. The CPU 32 stores the number of automatic size lines m in the automatic size line count m storage area 344.

The CPU 32 calculates the print region width H (S245). After the first round of processing, the print region width H is still 70. Since the character size of the currently processed line is to be set automatically, the number of dots corresponding to the character size has not been determined. Therefore, the print region width H remains 70.

The second line is the last line (YES at S246) and the number of automatic size lines m is 2 (NO at S300). Therefore, the CPU 32 determines by calculation the character size of the lines for which a character size is to be set automatically (S247). The current number of automatic size lines m is 2, so that the character size is obtained as 70/2=35 (dots). Since the largest character size that does not exceed the size of 35 dots is of 12 points (32 dots), both of the lines for which the character size is to be set automatically have a character size of 12 points.

As Example 5, a case is considered where the tape width is 24 mm (print region width H=128) and the character size of the first line is of nine points (24 dots) and the character sizes of the second and third lines are to be set automatically. The character size of the first line is not to be set automatically (NO at S244) and the print region width H is obtained as H=128−24=104 (S245). Since the first line is not the last line (NO at S246), the CPU 32 advances to processing of the second line (S248). The character size of the second line is to be set automatically (YES at S244). Therefore, the CPU 32 stores the line number n=2 in the line number n storage area 343 (S249) and determines the number of automatic size lines m as 1 to store the determined value (1) in the automatic size line count m storage area 344 (S250). The print region width H remains 104 (S245).

The CPU 32 advances to processing of the third line (S248). The character size of the third line is to be set automatically (YES at S244). Therefore, the CPU 32 stores n=3 in the line number n storage area 343 (S249) and determines the number of automatic size lines m as 2 to store the determined value (2) in the automatic size line number count m storage area 344 (S250). The print region width H remains 104 (S245). The third line is the last line (YES at S246) and the number of automatic size lines m is 2 (NO at S300). Therefore, the CPU 32 calculates the character size of the respective lines for which character sizes are to be set automatically (S247). Here, the character size is obtained as 104/2=52. Since the largest character size that does not exceed the size of 52 dots is of 18 points (48 dots), the character size of both of the lines for which a character size is to be set automatically is determined as 18 points. After thus acquiring the character size of each of the lines, the CPU 32 returns to the edit screen processing.

Figure 11:
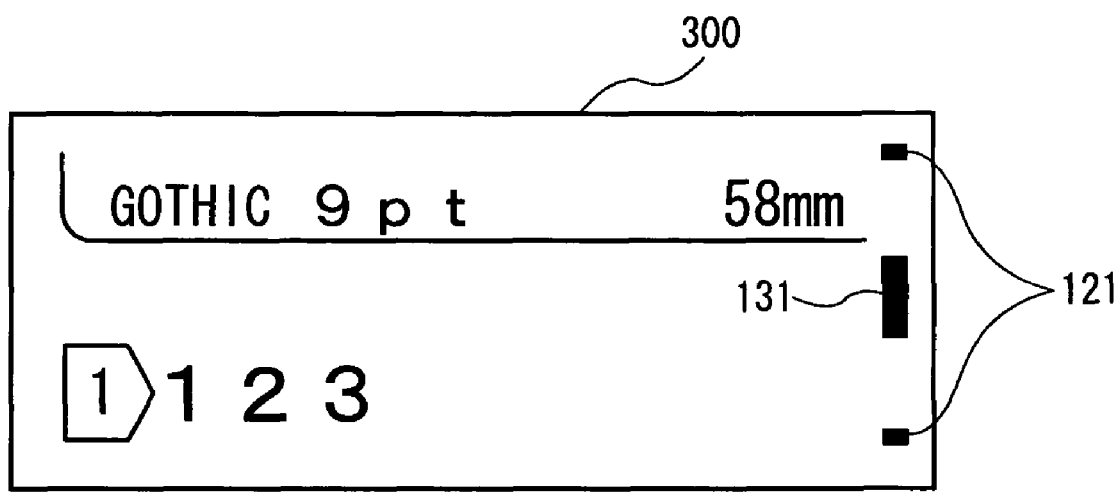
FIG. 11 is an explanatory illustration showing an example of the edit screen.

Having returned to the edit screen processing, the CPU 32 performs processing to acquire character region image data corresponding to the character size of each line acquired in the character size acquisition processing (S25). Character region image data indicates a proportion which the character region occupies of the tape width of a mounted tape when a character having a currently set size is printed on the tape. As shown in FIG. 11, the character region image 131 is shown in the tape width image 121. The character region image 131 is represented by a vertically long bold line between two vertically placed horizontal lines of the tape width image 121, which represents the sides of the tape. Therefore, the user can easily know how much of a tape the character region occupies. Processing to acquire the character region image will be described below with reference to FIG. 10.

After the character region image data acquisition processing starts, the CPU 32 sets a line number n as 1 to acquire the character region image data of the first line (S251). Next, From the character region image storage area 335 of the ROM 33, the CPU 32 acquires the width of a currently mounted tape and a character region image corresponding to the previously acquired character size of the currently processed line that has the line number n (S252). Then, the CPU 32 determines whether the line of the line number n is the last line (S253). If the line is not the last line (NO at S253), the CPU 32 adds 1 to the line number n (S254) and returns to S252 to acquire a character region image of the next line. If the line of the line number n is the last line (YES at S253), the CPU 32 returns to the edit screen processing. After thus acquiring the character region image of each line, the CPU 32 returns to the edit screen processing.

Figure 12:
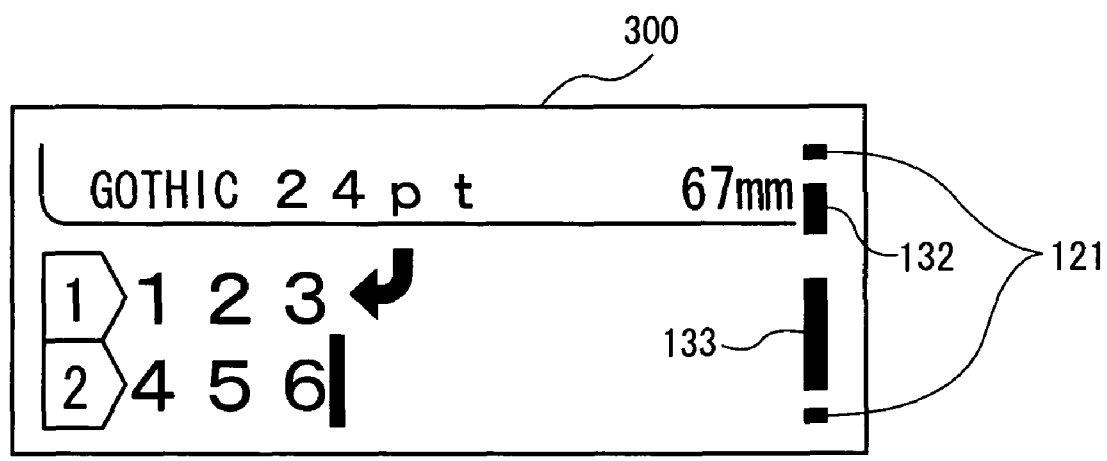
FIG. 12 is an explanatory illustration showing another example of the edit screen.
Figure 13:
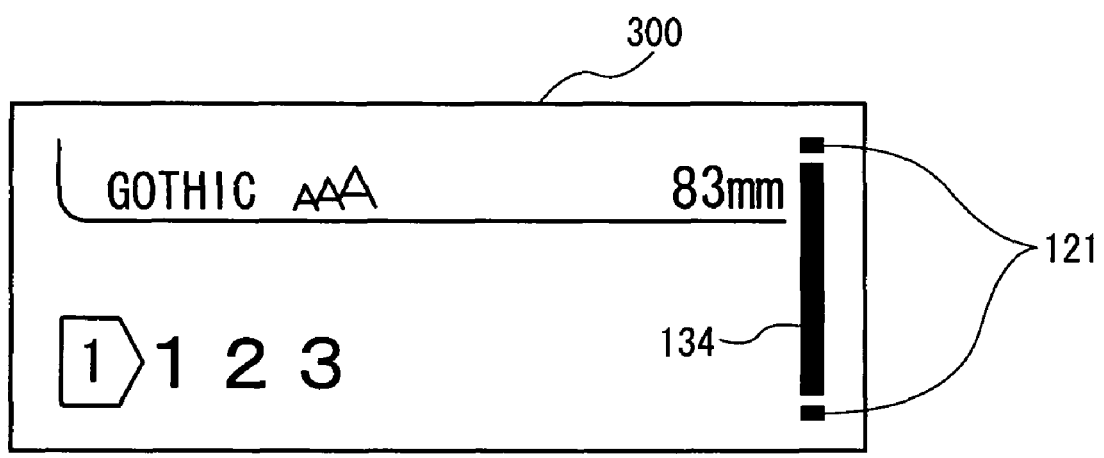
FIG. 13 is an explanatory illustration showing a further example of the edit screen.
Figure 14:
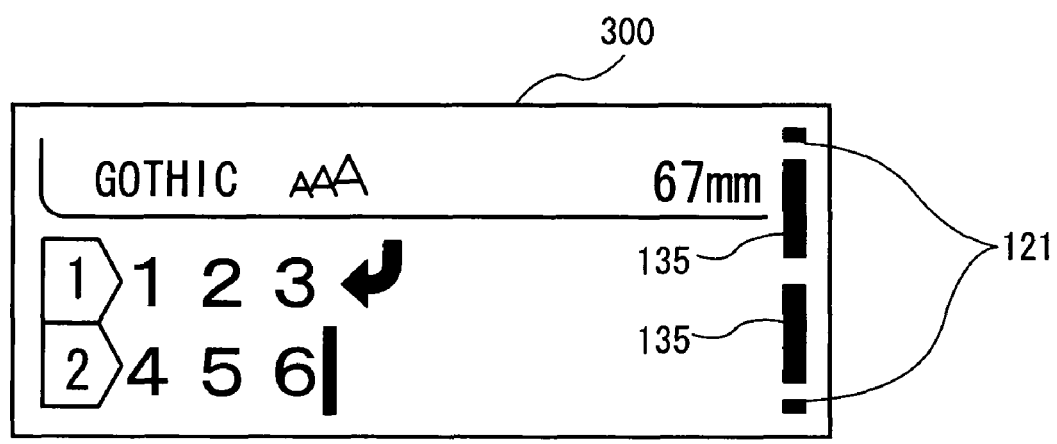
FIG. 14 is an explanatory illustration showing a still further example of the edit screen.

Having returned to the edit screen processing, the CPU 32 combines tape width image data, character region image data, and image data including other values, such as inputted texts, thereby generating the image data for displaying a full screen image (S26). The tape width image data has already been acquired in the tape width image data acquisition processing (S23). The character region image data has been already acquired in the character region image data acquisition processing (S25). The CPU displays the generated full screen image on the LCD 22 (S27). Through the above processing, an edit screen 300 appears on the LCD 22, as shown in FIGS. 11-14. The edit screen 300 for the above Example 1 is shown in FIG. 11, where the tape width is 18 mm and the first line has a character size of nine points. In FIG. 11, the tape width image 121 is indicated by vertically placed two horizontal lines and the character region image 131 is indicated by a vertically long bold line. The user can easily know that a proportion which a character region occupies of the width of the tape is significantly reduced, if only one line of 9-point characters is placed on an 18 mm-wide tape. The edit screen 300 for the above Example 2 is shown in FIG. 12, where the tape width is 18 mm and the first line and the second line have character sizes of 9 points and 24 points, respectively. In FIG. 12, the tape width image 121 is indicated by two vertically placed horizontal lines, between which a 9-point character region image 132 is placed above a 24-point character region image 133. Therefore, the user can easily know the positional relationship between the first line and the second line. The edit screen 300 for the above Example 3 is shown in FIG. 13, where the tape width is 12 mm, the character size is to be set automatically, and only one line is inputted. In FIG. 13, the tape width image 121 is indicated by vertically placed horizontal lines, between which a 24-point character region image 134 is displayed almost to the fullest. Therefore, the user can know that characters are to be printed to the full extent of the tape width. The edit screen 300 for the above Example 4 is shown in FIG. 14, where the tape width is 12 mm, the character size is to be set automatically, and two lines are inputted. In FIG. 14, the tape width image 121 is indicated by two vertically placed horizontal lines, between which two 12-point character region images 135 are uniformly placed. Therefore, the user can know that two lines of characters will be printed uniformly in size and to the full extent of the tape width.

After the display processing (S27), the CPU 32 acquires an input from the cover-open sensor 42 to determine whether the cover 24 is closed (S28). If the cover 24 is closed (YES at S28), there is a possibility that the tape cassette has been replaced and the tape width has been changed. Therefore, the CPU 32 returns to S22, to repeat the above processing from the step of acquiring the tape width.

If the cover 24 is not closed (NO at S28), the CPU 32 determines whether there is a change in the number of lines, such as an increase due to the pressing of an end-of-line key or a decrease due to the deletion of a line feed code (S29). If the number of lines is not changed (NO at S29), the CPU 32 returns to S28. If the number of lines is changed (YES at S29), the CPU 32 returns to S24, where the CPU 32 acquires the character size of each line, acquires character region image data (S25), and generates new image data for displaying a full screen image (S26) to display the newly generated image data. The CPU 32 repeats the above processing until the function key or the print key is pressed to end the edit processing so that the CPU 32 may exit the edit screen.

As described above, in the tape printing apparatus 1 of the present embodiment, when a character size is set on the setting screen, a tape width image and a character size image are combined to be displayed. Therefore, the user can easily know how much of the width of a tape a character that is currently set occupies when the character is printed on the tape. Each time the user sets the character size, a tape width image and a character size image corresponding to a character size that is set are combined to be displayed. Therefore, the user can appropriately change a setting upon seeing a generated and displayed image, thereby selecting an optimal setting. Consequently, the user need not adjust a setting by performing trial print. Moreover, on the edit screen, the proportion which a previously set character size occupies of a tape width is shown by a combined image of a character region image and a tape width image. Therefore, even if a plurality of lines are inputted or a character size is to be set automatically, the user can easily know the proportion which the printed character occupies of the width of the tape.

What is claimed is:
1. A tape printing apparatus that prints characters and/or symbols on a tape mounted in a detachable tape cassette, the apparatus comprising:
an input device that inputs characters and/or symbols to be printed on at least one line of a plurality of lines;
a setting device that sets a character size for each line, the character size being a size of respective characters and/or the symbols to be printed over the lines;

a display device that displays an edit screen used for displaying characters and/or symbols inputted by the input device;

a tape width acquisition device that acquires a tape width of the tape mounted in the tape cassette attached in the apparatus;

an edit tape width image storage device that stores edit tape width images corresponding to respective tape widths, each of the edit tape width images indicating a tape width to be displayed on the edit screen;

a character region width image storage device that stores a plurality of character region width images corresponding to respective character sizes, each of the character region width images indicating respective sizes of regions extending in a width direction of the tape, the regions being occupied by characters and/or symbols when characters and/or symbols are printed on tapes having respective tape widths indicated by the edit tape width images;

an input character size acquisition device that acquires the character size of characters and/or symbols inputted by the input device for each line;

an edit tape width image reading device that reads out one of the edit tape width images from the edit tape width image storage device, the one of the edit tape width images corresponding to the tape width acquired by the tape width acquisition device;

a character region width image reading device that reads out at least one of the plurality of character region width images from the character region width image storage device, the character region width images corresponding to the character size acquired for each respective line by the input character size acquisition device;

an edit guide image generation device that generates an edit guide image by combining the one of the edit tape width images and each of the at least one of the character region width images, the one of the edit tape width image being read out by the edit tape width image reading device, and each of the at least one of the character region width images being read out by the character region width image reading device; and an edit display control device that displays on the edit screen inputted characters and/or symbols for the at least one line of the plurality of lines with a predetermined display character size, and displays separately therefrom the edit guide image generated by the edit guide image generation device.

2. The tape printing apparatus according to claim 1, further comprising an attachment detection device that detects attachment of the tape cassette, wherein the tape width acquisition device acquires the tape width of the tape mounted in the tape cassette when the attachment is detected by the attachment detection device.

3. A non-transient computer-readable recording medium storing a tape print program, the program comprising instructions that cause a controller to perform:

a tape width acquisition step of acquiring a width of a tape mounted in a detachable tape cassette attached in a tape printing apparatus;

a character size acquisition step of acquiring a character size for each line of a plurality of lines, the character size being set beforehand, the character size being a size of respective characters and/or symbols to be printed over the lines;

an input character size acquisition step of acquiring the character size of inputted characters and/or symbols for each line;

an edit tape width image reading step of reading out one of edit tape width images stored for respective tape widths, corresponding to the tape width acquired in the tape width acquisition step, the edit tape width images indicating the respective tape widths;

a character region width image reading step of reading out at least one of a plurality of character region width images stored for respective character sizes, the character region with images corresponding to the character size acquired for each respective line in the input character size acquisition step, each of the character region width images indicating respective lens sizes of regions extending in a width direction of the tape, the regions being occupied by characters and/or symbols when characters the and/or symbols are is printed on tapes having the respective tape widths indicated by the edit tape width images;

an edit guide image generation step of generating an edit guide image by combining the one of the edit tape width images and each of the at least one of the character region width images, the one of the edit tape width images being read out in the edit tape width image reading step, and each of the at least one of the character region width images being read out in the character region width image reading step; and an edit display control step of displaying on an edit screen inputted characters and/or symbols input for the at least one line of the plurality of lines with a predetermined display character size, and displaying separately therefrom the edit guide image generated in the edit guide image generation step.

4. The computer-readable recording medium according to claim 3, wherein the tape width acquisition step acquires the tape width of the tape mounted in the tape cassette when attachment of the tape cassette is detected.

* * * * *